United States Patent [19]
DeNike et al.

[11] Patent Number: 5,238,691
[45] Date of Patent: Aug. 24, 1993

[54] PROCESS FOR COLORING FISH FLESH

[75] Inventors: Clair R. DeNike, Woodinville; Elmer J. Nelson; John E. Reid, both of Mukilteo, all of Wash.

[73] Assignee: Maranatha Seafoods, Inc., Mukilteo, Wash.

[21] Appl. No.: 721,106

[22] Filed: Jun. 26, 1991

[51] Int. Cl.$^5$ ............................................. A23L 1/27
[52] U.S. Cl. .................... 426/250; 426/264; 426/281; 426/643; 426/652
[58] Field of Search ............... 426/250, 281, 643, 652, 426/264, 265, 266, 268

[56] References Cited

U.S. PATENT DOCUMENTS

| | | | |
|---|---|---|---|
| 1,002,707 | 9/1911 | Kononoff | 426/281 |
| 3,489,573 | 1/1970 | Brankamp | 426/250 |
| 4,239,782 | 12/1980 | Cinquemani | 426/623 |
| 4,477,475 | 10/1984 | Fishman | 426/250 |
| 4,728,514 | 3/1988 | Lechnir | 426/250 |

FOREIGN PATENT DOCUMENTS

| | | | |
|---|---|---|---|
| 50-11457 | 5/1975 | Japan | 426/250 |
| 52-43904 | 11/1977 | Japan | 426/250 |
| 842755 | 7/1960 | United Kingdom | 426/250 |

OTHER PUBLICATIONS

Warner Jenkinson brochure, "Certified Food Colors", 1969, p. 42.

Primary Examiner—Steven Weinstein
Assistant Examiner—Anthony Weier
Attorney, Agent, or Firm—Christopher Duffy

[57] ABSTRACT

The rate of color development in fish flesh is dramatically accelerated by injecting the fish flesh with a first aqueous solution of the dye, lecithin with which to emulsify the fatty oils of the fish flesh, and a food grade salt; and then ageing the injected fish flesh by soaking it in a second solution of the dye and the salt, with the salt being dissolved in the second solution in such a lower concentration, relative to the concentration of the salt in the first solution, to generate an osmotic pressure differential between the respective first and second solutions, which will diffuse the dye throughout the flesh and produce a substantially even hue therethroughout in about 20–28 hours.

17 Claims, No Drawings

PROCESS FOR COLORING FISH FLESH

TECHNICAL FIELD

This invention relates to a process for coloring fish flesh, and in particular a process for doing so by the technique of U.S. Pat. No. 4,477,475, but at a dramatically accelerated rate of color development, as shall be explained.

BACKGROUND ART

In U.S. Pat. No. 4,477,475, the patentee disclosed a process wherein an aqueous solution of a food dye was injected into fish flesh by way of an array of hypodermic needles, and then the flesh containing the injected dye was aged for a period of time thereafter to allow the dye to diffuse through the flesh and produce a substantially even hue therethroughout. Previously, fish flesh had been colored by immersion in a coloring bath, and relative to that process, the patentee found that his process had a higher rate of productivity, as well as certain other advantages over the immersion process. However, the patentee also found that while a whole fish or sides of fish could be colored by his technique, the injection of the dye solution did not immediately lead to a uniform color distribution, even using a multiplicity of injection needles. Instead, if an even hue was to be expected, it was necessary to age the fish flesh for at least about two days, and preferably, at least about three days while in cure, to enable the dye to diffuse throughout the flesh from the sites in which it was initially concentrated when delivered by the needles. See Column 2 of the patent, as well as the example given in Columns 3-5 wherein the injected flesh was placed in a conventional cure solution for preferably at least about three days, both to cure the fish and to produce an even color distribution throughout the flesh of it. In Column 5, the flesh was injected with both a cure and a dye, or the cure was dissolved in the dye solution and then the cure and dye were injected into the fish in a single operation. But once again, the flesh was aged for two to three days for full diffusion of the food dye throughout the flesh and the development of an overall appearance which would be attractive to the consumer.

DISCLOSURE OF THE INVENTION

Fish flesh consists essentially of protein, fatty oils, and water. We have found that the patented process can be dramatically accelerated by, first, injecting into the fish flesh during the injection step, a first aqueous solution of an injection mixture consisting essentially of a water soluble food dye, a water soluble food grade emulsifier for the fatty oils of the fish flesh, and a food grade salt, and then ageing the fish flesh containing the aqueous injection mixture, by soaking the flesh in a second aqueous solution of a cure mixture consisting essentially of a compatible water soluble food dye and a food grade salt that is dissolved in the second solution in such a lower concentration, relative to the concentration of the salt in the first solution, to generate an osmotic pressure differential between the respective first and second solutions which will diffuse the dye throughout the flesh and produce a substantially even hue therethroughout substantially before the passage of two days, that is, substantially before the minimum time that was required by the patented process. The emulsifier and the pressure differential are both essential, as is the use of the dye in both solutions, since we have found that adding the emulsifier alone does not improve on the patented process, and generating the osmotic pressure differential alone has no such effect without the emulsifier. And again, we have also found that the dye must be present in both solutions if the improvement is to be obtained. Apparently, as the osmotic pressure differential "drives" the dye in solution throughout the fish flesh, the emulsifier simultaneously wets the oils in the flesh and enables the dye and oils to mix and more readily color the flesh. The emulsifier alone, however, would not have the benefit of the driving force, and the driving force alone would not account for the need for some means by which the transmigrated dye can interact with the oils and achieve the desired effect.

Of course, accelerating the rate of color development is a significant improvement over the patented process, since the improved process dramatically reduces the time during which the flesh is exposed to bacterial action, or the risk of the same, before it can be smoked or frozen to terminate the ageing of it. In fact, we have found that by using a water soluble food grade emulsifier with an HLB factor of less than 7, that is, one which is more lipid-loving than water loving in the hydrophilic/lipophilic balance, the injected dye will diffuse through the flesh and produce the desired effect when the flesh is aged in the order of 20-28 hours in the second solution. The actual time within this range, depends of course, on the character of the fish itself, since the more oily the fish, the more dependent the process is on the emulsifier to enable the fish oil and injected dye to mix in solution. Beyond that, we have also found that a time within the lower end of the range can be more assured by using lipid loving emulsifiers such as lecithin which are amphoteric (or zwitterionic), as well as characterized with an HLB factor of less than 7. This means that a body of fish flesh can be injected in the afternoon on one day, soaked in the cure solution that night, and then removed and either smoked or frozen the next morning.

Preferably, the cure is carried out in a cooler operated at about 33-38 degrees Fahrenheit, again to minimize bacterial action or the risk of the same in the "shelf life" of the ageing step.

Lecithin is the preferred emulsifier for the process at the present time because it is amphoteric, has an HLB factor of about 3, and of course, is naturally occurring. But other lipids which contain polar components in the molecule so as to be water soluble, may also be employed, including the phospholipids and those water soluble monoglycerides which have a suitable HLB factor. Those in the art will know that all of these lipids with polar components form so-called "micelle" in water, that is, membranous-like structures consisting of aggregated clusters of molecules in colloidal suspension, and in this sense are "water soluble." In addition, in each such lipid, the long hydrophobic hydrocarbon tail is surrounded by hydrophilic polar phosphate groups which are solvated by water molecules, so that those groups of the lipid which have an affinity for water are presented to the aqueous phase, while those which are not, are folded into the center, and this accounts for their solubility in water as "micelle." Those in the art will also know, moreover, that emulsifiers can be mixed to achieve a wide variety of effects, so that even certain polysorbates may be operable, particularly when mixed with water soluble emulsifiers having lower HLB factors. The term "water soluble food grade emulsifier" includes, therefore, a single water soluble food grade compound with emulsifying properties, as well as a mix of two or more such compounds. In fact, lecithin itself is commonly employed in commercial form, and the commercial form is a mixture of phosphatides (phospholipids) and the oil obtained from drying the separated gums derived from the degumming of soybean oil. Commercially, then, it may consist of phosphatides (lecithin), cephalin and other fat-like phosphorous containing compounds, all entrained in 30%-35% soybean oil. In current chemical literature, however, lecithin is referred to simply as a phosphatidyl choline, that is, a phosphatide (or phospholipid) in which the choline forms the organic base.

In the aqueous injection mixture, the emulsifier commonly comprises 1%-5% by weight of the first solution. The dye in the second solution is "compatible" with that used in the first solution in the sense that the two dyes are adapted to provide the desired color, such as a salmon color for smoked trout. Commonly, the dye is the same from one solution to the next, and is present between the two solutions in sufficient quantity to provide the desired color.

The salt is also commonly the same from one solution to the next, and for economy, is commonly sodium chloride. The salinity given the respective solutions is a function of the osmotic pressure differential needed to drive the dye in solution throughout the fish flesh, and commonly is 60-85 degrees for the aqueous injection solution, and 1-5 degrees for the aqueous cure solution, as measured by a salometer.

At the conclusion of the process, the colored flesh readily lends itself to smoking, or to freezing for smoking at a later time. In fact, the process was developed for the purpose of "texturing" fish flesh prior to smoking it.

The term "smoking" includes hot or cold smoking, the latter requiring an increase in salinity, as is conventional in the fish smoking industry.

BEST MODE FOR CARRYING OUT THE INVENTION

A Townsend Model 1400 Injector produced by Townsend Engineering Company, Des Moines, Iowa, was described in U.S. Pat. No. 4,477,475 and the Patent is incorporated herein by reference, both for purposes of the description of the machine and the use of the same in carrying out the process by which the present invention has effected the aforementioned improvements. Alternatively, a FamCo-Reiser Injector from Robert Reiser and Company, Inc., of Canton, Mass. may be used.

As an example of the present process wherein all weights were derived from one gallon or 128 ounces of water as a standard measurement, a first aqueous solution of an injection mixture was prepared consisting of 0.074 ounce FDC yellow No. 6, 0.010 ounce FDC red No. 40, 0.159 pound commercial lecithin, and sufficient sodium chloride to produce 62.5 degrees salometer, first, by mixing the salt with water to achieve salt water of approximately that salinity, then mixing the lecithin with the salt water, and then mixing the dyes together in warm water and adding the mix to the solution of lecithin and salt water. Afterward, the entire mix was thoroughly remixed to insure a consistency throughout, and the solution was injected into a series of fish fillets using the FamCo-Reiser Injector mentioned above and the patented injection procedure. Meanwhile, 0.0037 ounce FDC yellow No. 6, 0.000417 ounce FDC red No. 40, and sodium chloride were mixed together, first, the salt in the water to achieve a salinity of 5 degrees salometer, and then the dyes with the salt water to form the second solution. At the conclusion of the injection step, the injected fillets were put into the second solution, meatside up, and the container for the same was put into a cooler for 24 hours soaking time, with the cooler operated at 34 degrees Fahrenheit. At the conclusion of the soak, the dyes were observed as being completely diffused through the flesh so that the flesh had an even hue therethroughout. The colored flesh was also observed as ready to be frozen or put through a conventional hot or cold smoke operation. Of course, either operation arrests the diffusion of the dye, yet because of the accelerated effect achieved by the improved process, there was no need for further ageing of the flesh beyond the indicated time.

HLB factor is discussed at length in *Bailey's Industrial Oils and Fat Products,* Fourth edition, Volume I, edited by Daniel Swern and published by John Wiley and Sons, New York, N.Y. A general discussion of the factor begins at page 596, and specific reference is made to the HLB test at page 676.

We claim:

1. In a process of coloring fish flesh by the steps of injecting an aqueous solution of a food dye into the flesh via an array of a plurality of hypodermic needles, and ageing the fish flesh containing said injected dye for a period of time thereafter to diffuse the dye through the flesh and produce a substantially even hue therethroughout, the improvement comprising:

injecting into the fish flesh during the aforesaid injection step, a first aqueous solution of an injection mixture consisting essentially of a water soluble food dye, a water soluble food grade emulsifier for the fatty oils of the fish flesh, and a food grade salt, said first aqueous solution having a first concentration of salt therein, and ageing the fish flesh containing said first aqueous solution by soaking the flesh in a second aqueous solution of a cure mixture consisting essentially of a compatible water soluble food dye and a food grade salt that is dissolved in the second aqueous solution in a second concentration that is sufficiently lower than the first concentration of salt in the first aqueous solution, to generate an osmotic pressure differential between the respective first and second aqueous solutions, which will diffuse the dye throughout the flesh and produce a substantially even hue therethroughout in about 20-28 hours.

2. The process according to claim 1 wherein the emulsifier has an HLB factor of less than 7.

3. The process according to claim 2 wherein the emulsifier has an HLB factor of about 3.

4. The process according to claim 2 wherein the emulsifier is amphoteric.

5. The process according to claim 2 wherein the emulsifier is a lipid which contains polar components so as to be water soluble.

6. The process according to claim 5 wherein the emulsifier is a phospholipid.

7. The process according to claim 1 wherein the emulsifier comprises 1%-5% by weight of the first solution.

8. The process according to claim 1 wherein the first solution has a salinity of about 60-85 degrees salometer, and the second solution has a salinity of about 1–5 degrees salometer.

9. The process according to claim 1 wherein the emulsifier is amphoteric and has an HLB factor of less than 7, and comprises about 1%–5% by weight of the first solution, and wherein the first solution has a salinity of about 60–85 degrees salometer, and the second solution has a salinity of about 1–5 degrees salometer.

10. The process according to claim 1 wherein the fish flesh is soaked for about 24 hours in the second solution.

11. The process according to claim 1 wherein the ageing step is carried out in a cooler operated at 33–38 degrees Fahrenheit.

12. The process according to claim 1 wherein the second aqueous solution contains the food grade dye included in the first aqueous solution.

13. The process according to claim 1 wherein the second aqueous solution contains the food grade salt included in the first aqueous solution.

14. In a process of coloring fish flesh by the steps of injecting an aqueous solution of a food dye into the flesh via an array of a plurality of hypodermic needles, and ageing the fish flesh containing said injected dye for a period of time thereafter to diffuse the dye through the flesh and produce a substantially even hue therethroughout, the improvement comprising:
   injecting into the fish flesh during the aforesaid injection step, a first aqueous solution of an injection mixture consisting essentially of a water soluble food dye, lecithin with which to emulsify the fatty oils of the fish flesh, and a food grade salt,
   said first aqueous solution having a first concentration of salt therein, and
   ageing the fish flesh containing said first aqueous solution by soaking the flesh in a second aqueous solution of a cure mixture consisting essentially of a compatible water soluble food dye and a food grade salt that is dissolved in the second aqueous solution in a second concentration that is sufficiently lower than the first concentration of salt in the first aqueous solution, to generate an osmotic pressure differential between the respective first and second aqueous solutions, which will diffuse the dye throughout the flesh and produce a substantially even hue therethroughout in about 20–28 hours.

15. The process according to claim 14 wherein the first solution has a salinity of about 60–85 degrees salometer, and the second solution has a salinity of about 1–5 degrees salometer.

16. The process according to claim 15 wherein lecithin comprises about 1%–5% by weight of the first solution.

17. The process according to claim 15 wherein the fish flesh is soaked for about 24 hours in the second solution.

* * * * *